United States Patent [19]

Grzesiak

[11] 4,125,265
[45] Nov. 14, 1978

[54] VALVE STEM SEAL

[75] Inventor: Anthony J. Grzesiak, Burnham, Ill.

[73] Assignee: Borg-Warner Corporation, Chicago, Ill.

[21] Appl. No.: 813,370

[22] Filed: Jul. 6, 1977

[51] Int. Cl.² ............................................. F16J 15/32
[52] U.S. Cl. .................................. 277/152; 277/189
[58] Field of Search ............... 277/189, 153, 208, 152, 277/48, 165, 212

[56] References Cited

U.S. PATENT DOCUMENTS

| 2,821,973 | 2/1958 | Guhman | 123/188 P |
| 2,858,150 | 10/1958 | Neher et al. | 277/183 |
| 2,906,255 | 9/1959 | Bunce | 123/188 P |
| 3,069,174 | 12/1962 | Skinner | 277/48 |
| 3,268,235 | 8/1966 | Jacobellis et al. | 277/165 |
| 3,498,621 | 3/1970 | Wilson | 277/152 |
| 3,563,442 | 2/1971 | Kretchman | 277/208 |
| 3,599,992 | 8/1971 | Kammeraad | 277/189 |
| 3,601,420 | 8/1971 | Binford | 277/212 |
| 3,621,952 | 11/1971 | Long | 277/153 |
| 3,910,586 | 10/1975 | Todaro | 277/189 |
| 3,920,253 | 11/1975 | Bauer | 277/189 |

Primary Examiner—Robert I. Smith
Attorney, Agent, or Firm—James A. Geppert

[57] ABSTRACT

A valve stem seal for an intake or exhaust valve in an internal combustion engine where the seal allows a metered amount of oil to run down the valve stem for lubrication of the stem in its valve guide. The seal has a cylindrical wall engaging the valve guide boss and an upper inwardly extendng flange provided with twin sealing lobes on the internal surface separated by an annular groove; the lobes and groove providing a pumping action for oil during reciprocation of the valve stem.

11 Claims, 6 Drawing Figures

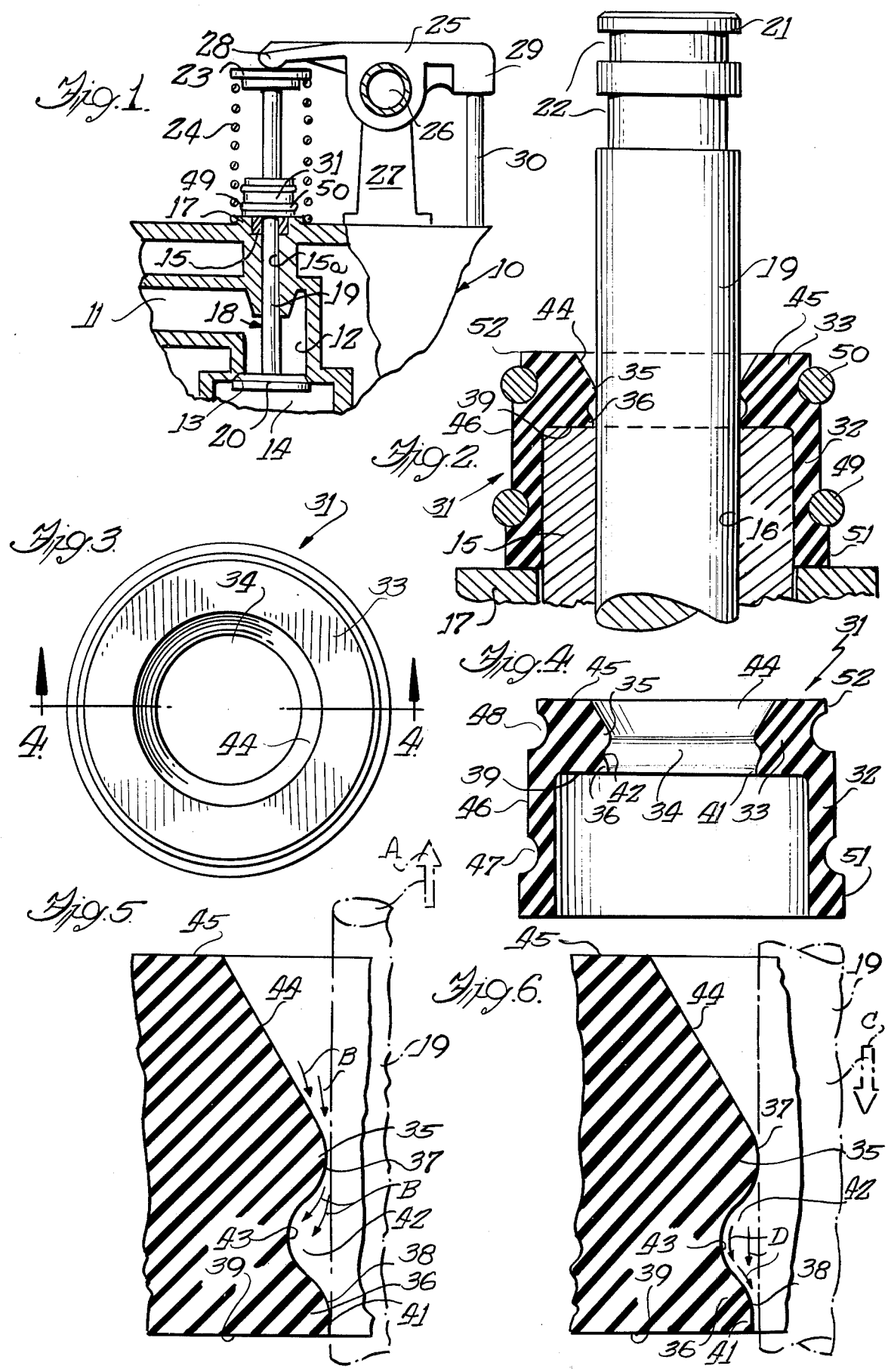

VALVE STEM SEAL

BACKGROUND AND SUMMARY OF THE INVENTION

The present invention provides an improved valve stem seal and more particularly a valve stem seal having a pumping action for oil to lubricate the valve stem in its associated guide.

An internal combustion engine includes a plurality of intake and exhaust valves, each valve comprising a valve head received in a valve seat defining an intake or exhaust passage and an elongated stem reciprocably mounted in a valve guide formed in the cylinder head of the engine. The end of the valve stem remote from the head is engaged by a rocker arm in an overhead valve engine or by a plunger in an L-shaped engine which is cam operated. Oil may be supplied to the upper end of the stem through an oil splash system or by a localized oil supply through the rocker arm to the point of contact with the end of the valve stem so that lubrication is present between the valve stem and its associated guide.

Oil is also present in the upper cylinder area of overhead cam engines due to slow oil draindown at higher engine speeds. This oil floods the upper valve seal area, making umbrella-type seals not functional in overhead cam engines.

In order to reduce oil consumption and provide optimum engine performance, a seal has been provided for the valve stem ranging from the umbrella-type shield utilized to deflect the majority of oil away from the upper end of the valve guide to a seal closely conforming to and engaging the valve guide boss and valve stem to restrain all oil flow to the valve stem save a thin film acting as a lubricant for the stem in the guide. However, many of these metering-type seals were ineffective and either dried out during use so that no oil was metered or, because of wear, allowed an excess of oil to enter the valve guide. The present invention obviates these problems by providing a valve stem seal with a positive pumping action.

The present invention comprehends the provision of a valve stem seal formed of an elastomeric material tending to prevent capillary flow and closely embracing the valve stem and its associated guide boss. The seal is provided with a cylindrical wall encompassing the valve guide boss and an inwardly extending flange at the upper end engaging the valve stem at its inner peripheral internal surface with a pair of annular lobes separated by an annular groove acting to positively pump oil along the valve stem during reciprocation of the valve.

The present invention also comprehends the provision of a valve stem seal having a pair of sealing lobes engaging the valve stem with an annular groove therebetween providing an oil reservoir for the metering action. Also, above the upper sealing lobe, the internal wall of the flange is angled upwardly and outwardly so that capillary action maintains oil flow downwardly to the sealing lobe area, resulting in oil being constantly provided to the sealing lobe area to prevent the seal from drying out during use.

Further objects are to provide a construction of maximum simplicity, efficiency, economy and ease of assembly and operation, and such further objects, advantages and capabilities as will later more fully appear and are inherently possessed thereby.

DESCRIPTION OF THE DRAWING

FIG. 1 is a fragmentary side elevational view, partially in cross section, of an overhead valve assembly provided with a seal of the present invention.

FIG. 2 is an enlarged partial vertical cross sectional view of the seal and valve guide boss with the valve stem shown in elevation.

FIG. 3 is a top plan view of the valve stem seal.

FIG. 4 is a vertical cross sectional view taken on the line 4—4 of FIG. 3.

FIG. 5 is an enlarged partial cross sectional view of the seal showing the action thereof upon upward movement of the valve stem.

FIG. 6 is similar to FIG. 5 but showing the action upon downward movement of the valve stem.

DESCRIPTION OF THE PREFERRED EMBODIMENT

Referring more particularly to the disclosure in the drawing wherein is shown an illustrative embodiment of the present invention, FIG. 1 discloses a portion of a cylinder head 10 for an internal combustion engine, such as utilized for an automotive vehicle, wherein the cylinder head has a passage 11 which may be either a part of the fuel intake system or part of the exhaust system. The passage 11 extends to an opening 12 bounded by a valve seat 13 into a combustion chamber 14. Secured to the cylinder head 10 is a valve guide boss 15 which may either be an integral part of the cylinder head or a separate member suitably secured within the cylinder head and axially alighed with a cylindrical passage 15a opening into the passage 11. Valve guide 16 is formed as the interior surface in the valve guide boss 15 and forms a continuation of passage 15a. An annular embossment 17 on the cylinder head 10 has a counterbore receiving the valve guide boss 15.

A valve 18 is provided in the cylinder head 10 with an elongated valve stem 19 received in the guide 16 in the valve guide boss 15 and an enlarged valve head 20 positioned below the opening 12 and sealingly engaging the valve seat 13 to open and close the communication between the passage 11 in the cylinder head and the combustion chamber 14 as the valve reciprocates. The valve stem 19 projects upwardly beyond the top of the valve guide boss 15 and is provided at its upper end 21 with grooves 22 for securing a collar or plate 23 thereto. A coil spring 24 encompasses the valve stem 18 and boss 15 with one end abutting the collar 23 and the opposite end encompassing the embossment 17 and abutting the cylinder head 10.

To operate the valve 18, a rocker arm 25 is shown pivotally mounted at 26 for rocking movement on a bracket 27 extending upward from the cylinder head 10, with one end 28 of the arm engaging the upper end 21 of the valve stem 19 and the other end 29 engaged by a push rod 30 which is suitably operated by engine-driven cam means (not shown).

To reduce wear at the point of rubbing contact between the end 28 of the rocker arm and the end 21 of the valve stem and to lubricate the valve guide 16, oil is conventionally supplied from an opening (not shown) in the rocker arm 25 to the end 21 of the valve stem, and the oil then runs downwardly along the stem to the valve guide. If there is excess clearance between the valve stem 19 and the guide 16, the oil will continue to move down the stem to the valve head 20. If the valve controls the intake to the combustion chamber 14, the oil will be drawn into the chamber and will be burned. Likewise, for an exhaust valve, the oil will be burned by the hot gases and, in either instance, cause smoke in the exahaust.

To prevent the leakage of oil to the combustion area, a valve seal 31 is provided on the valve stem 19 at the upper end of the boss 15. The seal is formed of a suitable elastomeric material and has a generally inverted cup shape with a cylindrical portion or skirt 32 abutting the embossment 17 and closely encompassing the boss 15 and an upper transverse wall or flange 33 positioned on the upper end of the boss and having a central opening 34 receiving the valve stem 19 therethrough.

The interior wall defining the opening 34 is provided with a pair of annular axially spaced sealing lobes 35 and 36 having rounded outer surfaces 37 and 38, respectively, adapted to sealingly engage the valve stem 19. As seen in FIGS. 2 and 4 through 6, the lower lobe surface 38 intersects the bottom flat surface 39 of the wall 33 in an abrupt corner 41. An annular groove or reservoir 42 is formed between the lobes 35 and 36 and has a curved surface 43 which is a continuation of the curved surfaces 37 and 38. Above the upper lobe 35, the wall surface 44 tapers upwardly and outwardly away from the valve stem at a suitable angle as a smooth continuation of the curved surface 37 to intersect the top wall surface 45.

The outer surface 46 of the seal is generally cylindrical and has a pair of annular grooves 47 and 48 therein adapted to receive conventional snap rings 49, 50. Below the lower ring 49, the wall has a slightly larger diameter than the wall surface 46 to provide an annular external rib 51, and the wall 52 above the upper ring 50 has a slightly smaller diameter than the surface 46, with the groove 48 and ring 50 being located opposite the wall 33. The rib 51 and the rings 49, 50 aid in retaining the seal on the upper end of the valve guide boss 15, however the upper ring 50 may not be necessary in the assembly. Although snap rings 49, 50 are shown for this embodiment, other suitable retaining means may be utilized for this seal.

This seal 31 is designed to take advantage of the top seal surface movement induced in the positive valve stem seal by the friction occuring between the seal and the valve stem 19. The angle of the side wall 44 is such that capillary action maintains oil flow downward to the sealing lobe area. Considering FIG. 5, a valve upstroke, as shown by arrow A, dishes the seal surface 45 upwardly and brings the lower sealing lobe 36 into sealing contact with the valve stem 19, while the seal on the upper lobe 35 is simultaneously broken. With the upper seal broken, oil moves downward past the lobe 35 to fill the oil reservoir 42 as shown by arrows B.

Upon a valve downstroke as shown by the arrow C in FIG. 6, the upper lobe 35 is brought back into interference with the valve stem 19 to provide a seal therebetween. The relative downward movement of the seal wall 33 is halted by engagement of the surface 39 with the top of the valve guide boss 15 and, as compression continues on the downstroke, oil is forced past the structurally weaker lower lobe 36 aided by engine vacuum as shown by the arrows D.

The present seal provides a positive pumping action of the oil along the valve stem to lubricate the valve guide, with the amount of oil being metered in the pumping action controlled by the volume of the oil reservoir between the sealing lobes.

I claim:

1. A valve stem seal adapted to be mounted on the end of a cylindrical valve guide boss, comprising an annular skirt portion adapted to encompass the valve guide boss and a transversely extending wall at the upper end abutting the upper surface of the boss and sealingly engaging a valve stem, the wall having an internal surface providing a pair of axially spaced annular sealing lobes separated by an annular groove closely adjacent the upper surface of the boss, the lower surface of said transverse wall intersecting the lowermost sealing lobe to form an abrupt corner, and means above said sealing lobes to promote capillary flow of oil to said sealing lobes comprising an upwardly and outwardly tapered internal surface extending to the upper surface of said wall.

2. A valve stem seal as set forth in claim 1, in which the surfaces of said sealing lobes and groove are smooth rounded surfaces merging into one another.

3. A valve stem seal as set forth in claim 1, in which said annular groove forms an oil reservoir between said sealing lobes for lubrication of the valve stem.

4. A valve stem seal as set forth in claim 1, in which said tapered surface merges smoothly into the rounded surface of said upper sealing lobe.

5. A valve stem seal as set forth in claim 1, in which said transverse wall deflects upon reciprocatory movement of the valve stem resulting in a pumping action by said sealing lobes.

6. A valve stem seal as set forth in claim 5, in which upward movement of the valve stem causes the transverse wall to be dished upwardly so that the lower sealing lobe is brought into sealing contact with the valve stem and the sealing contact between the upper sealing lobe and the valve stem is broken to allow oil flow from above the seal into the oil reservoir, and upon downward movement of the valve stem, the upper lobe is moved into sealing engagement with the valve stem and the top of the valve guide boss stops movement of the lower lobe so that further compression of the seal and engine vacuum causes the oil in the reservoir to be forced past the lower lobe.

7. A valve stem seal assembly including a valve having a stem reciprocating in a valve guide, and a seal comprising an annular skirt portion adapted to sealing engage the upper end of a valve guide boss and a transverse wall at the upper end of the skirt abutting the end surface of the boss and sealingly engaging the valve stem, the transverse wall having a central opening receiving the valve stem and defined by an internal surface having a pair of axially spaced annular sealing lobes separated by an annular groove forming an oil reservoir, said sealing lobes and groove being defined by curved surfaces merging smoothly together, the lower surface of the transverse wall intersecting the lower sealing lobe adjacent its apex to provide an abrupt corner, and an upwardly and outwardly inclined internal surface above the sealing lobes and merging smoothly into the curved surface of the upper lobe to promote capillary flow from the upper surface of the wall to the sealing lobes.

8. A valve stem seal as set forth in claim 7, in which said transverse wall deflects upon reciprocal movement of the valve stem to provide a pumping action by said sealing lobes and reservoir.

9. A valve stem seal as set forth in claim 8, in which upward movement of the valve stem dishes the transverse wall upwardly so that the lower lobe is brought into sealing contact with the valve stem and the sealing contact between the upper lobe and the stem is broken to allow oil flow to the reservoir, and downward movement of the valve stem causes the upper lobe to return to sealing engagement with said valve stem and the upper surface of the valve guide boss is abutted by the lower lobe, and further movement of the valve stem causes compression of the seal so that the oil in the reservoir is forced past the lower lobe to lubricate the valve stem and guide.

10. A valve stem seal as set forth in claim 9, in which the pumping action of the sealing lobes and reservoir meters the quantity of oil released for lubrication of the valve stem and guide.

11. A resilient seal adapted to be mounted on the end of a cylindrical guide boss having a reciprocating rod therein, comprising an annular skirt portion adapted to encompass the guide boss and a transversely extending wall at the upper end abutting the upper surface of the boss and sealingly engaging the rod, the wall having an internal surface providing a pair of axially spaced annular sealing lobes separated by an annular groove closely adjacent the upper surface of the boss, the lower surface of said transverse wall intersecting the lowermost sealing lobe to form an abrupt corner, and means above said sealing lobes to promote capillary flow of oil to said sealing lobes comprising an upwardly and outwardly tapered internal surface extending to the upper surface of said wall.

* * * * *

UNITED STATES PATENT OFFICE
CERTIFICATE OF CORRECTION

PATENT NO. : 4,125,265
DATED : November 14, 1978
INVENTOR(S) : ANTHONY J. GRZESIAK It is certified that error appears in the above-identified patent and that said Letters Patent are hereby corrected as shown below:

Column 4, line 44, cancel "sealing" and insert -- sealingly --.

Signed and Sealed this

Twelfth Day of June 1979

[SEAL]

Attest:

RUTH C. MASON
Attesting Officer

DONALD W. BANNER
Commissioner of Patents and Trademarks